United States Patent [19]
Thomas et al.

[11] Patent Number: 5,287,183
[45] Date of Patent: Feb. 15, 1994

[54] SYNCHRONOUS IMAGING SYSTEM

[75] Inventors: Robert L. Thomas; Lawrence D. Favro, both of Huntington Woods; Pao-Kuang Kuo, Troy, all of Mich.

[73] Assignee: Wayne State University, Detroit, Mich.

[21] Appl. No.: 488,310

[22] Filed: Mar. 5, 1990

[51] Int. Cl.$^5$ .............................................. H04N 5/14
[52] U.S. Cl. ................................... 348/571; 374/123; 378/98.2
[58] Field of Search ................ 358/110, 106, 95, 115, 358/160, 115; 374/4, 5, 57, 123-129; H04N 5/14

[56] References Cited

U.S. PATENT DOCUMENTS

| | | | |
|---|---|---|---|
| 3,668,396 | 6/1972 | Asars et al. | 358/110 |
| 4,682,222 | 7/1987 | Smith et al. | 358/115 |
| 4,755,874 | 7/1988 | Esrig et al. | 358/101 |
| 4,878,116 | 10/1989 | Thomas et al. | 358/160 |
| 5,020,920 | 6/1991 | Gopalsani et al. | 374/4 |

Primary Examiner—James J. Groody
Assistant Examiner—David E. Harvey
Attorney, Agent, or Firm—Steven L. Permut

[57] ABSTRACT

The assembly (10, 10') is a real time imaging device for detecting radiation from an object field (12) which is periodic in time. A video camera (14) detects emitted and reflected radiation from the object field (12) and produces a video signal of the image and a timing signal. A processor (16) synchronously averages successive video signals and stores same in an image buffer (26) to obtain an image from which has been eliminated unsynchronous noise. Alternatively, the elimination of unsynchronous or ambient noise may be performed partially or wholly within the camera (14) prior to processing.

37 Claims, 9 Drawing Sheets

SYNCHRONOUS IMAGING SYSTEM

TECHNICAL FIELD

The invention relates to a real-time imaging system operating in synchronism with an object field which is periodic or pulsed in time wherein unsynchronous background images and noise is filtered leaving only relevant, synchronous time-varying information in the image.

BACKGROUND ART

In recent years video image acquisition techniques, both in the visible and in the infrared, have found application in a number of areas including nondestructive evaluation, remote sensing, energy control, visual inspection, robotics, medical imaging, machine vision, etc. Efforts to improve the quality of the images produced are usually focussed on post-processing, i.e. techniques for processing the images after they are acquired and stored in a computer. While these techniques are highly developed, and are capable of improving the image quality to a considerable extent, they suffer from the drawback that they cannot add information to the image. That is, if information about some feature of the object field was not originally present in the image acquired by the camera, no amount of post-processing can put it there afterward.

When images are acquired by slower point-by-point scanning instead of using a video camera, it is often possible to improve the quality of images by using conventional signal processing techniques, as opposed to image processing techniques, on the incoming data. For instance, one common approach to making so-called thermal-wave images is to heat the object to be observed in a periodic fashion, and to use a single infrared detector focussed on one point of the object to detect the periodic heating and cooling of that point. The resulting periodic signal from the detector is then processed by a conventional lock-in amplifier, which is referenced to the periodic heat source, and which rejects that portion of the detector's signal which is not synchronous with the heat source. The result is an improved signal-to-noise ratio, and the rejection of any non-synchronous background signal. The information in this improved signal is then stored as one pixel of what will eventually be an image, and the system then moves on to acquire the next pixel. The essential feature here is the use of synchronous detection to enhance the image before it is stored in the computer, thus negating the need for post-processing. The major drawback of such a system is that it is quite slow because the data for each pixel are processed sequentially by a single lock-in amplifier, its being impractical to have a separate lock-in amplifier for each of the pixels in a 512×512 (262, 144) pixel image.

An example of conventional lock-in detection with a single lock-in amplifier as described above is given by U.S. Pat. No. 4,652,757, issued Mar. 24, 1987 in the name of Carver, which discloses a technique for heating the object to be observed in a periodic fashion with a pump laser, and using a single infrared detector and lock-in to detect the periodic heating and cooling of the object U.S. Pat. No. 4,878,116, filed Jun. 2, 1988 and issued Oct. 31, 1989, invented by the same inventors of the subject application and assigned to the same assignee, discloses a vector lock-in imaging system which uses an infrared or visible video camera coupled to a real-time image processor and a computer workstation to perform phase-sensitive lock-in detection on all of the pixels of an image in parallel, thus achieving the effect of having 512×512 lock-in amplifiers. In this invention the processor multiplies the incoming video signal by the sine and the cosine of the reference signal in real time, and averages the two products in separate frame buffers to produce in-phase and quadrature images The result is the enhancement of the synchronous components of the image and the suppression of incoherent noise. Since the processing is performed in real time, this system is much faster than those which employ either a point-by-point scan in conjunction with a single lock-in, or those which rely solely on post-processing of images.

SUMMARY OF THE INVENTION AND ADVANTAGES

The invention is a method and an imaging assembly for producing images synchronous with the periodicity of an object field. The assembly comprises stimulus control means for producing a reference signal indicating the occurrence of a synchronizing pulse representing the periodicity of the object field, camera means for detecting radiation from the object field producing a video signal of the image and a timing signal for the video signal. Also included is processor means for acquiring a first video signal at a first time delay from the synchronizing pulse including synchronous and unsynchronous image components and for acquiring a second video signal at a second time delay from the synchronizing pulse including substantially unsynchronous noise, and for subtracting the second video signal from the first video signal to produce an image signal representing the image synchronous with the periodicity of the object field.

Also included is an imaging assembly for producing images synchronous with the periodicity of an object field which comprises stimulus control means for producing a reference signal representing the periodicity of the object field, camera means for detecting radiation from the object field producing a video signal of the image and timing signal, delay generator means for receiving the reference signal and the timing signal and for producing a control signal representative of the synchronism between the reference signal and the timing signal, and the assembly is characterized by the camera means including adjustment means for receiving the control signal and for receiving the radiation to produce electrically a frame of the image comprised of a plurality of pixels having a magnitude component proportional to the synchronism.

The advantages of the new imaging assembly over the one described in U.S. Pat. No. 4,878,116 above are twofold: the new assembly does true parallel processing; and subsequent processing of the video signal is simplified thereby reducing the complexity of the real-time processing system which is necessary to complete the system. Furthermore, acquiring the images in synchronous within the camera further increases the data acquisition rate.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
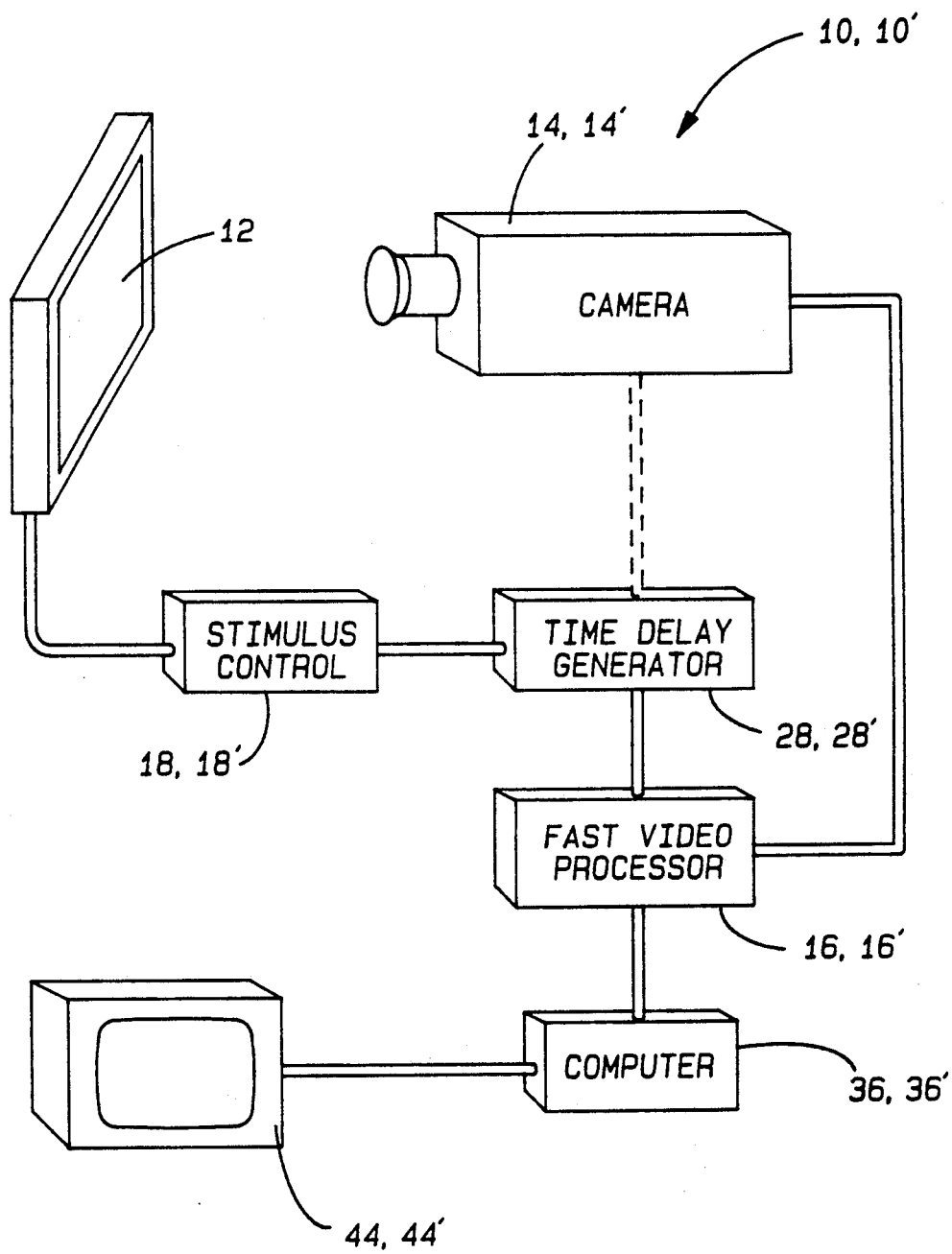
FIG. 1 is a perspective view of the subject invention.
Figure 6:
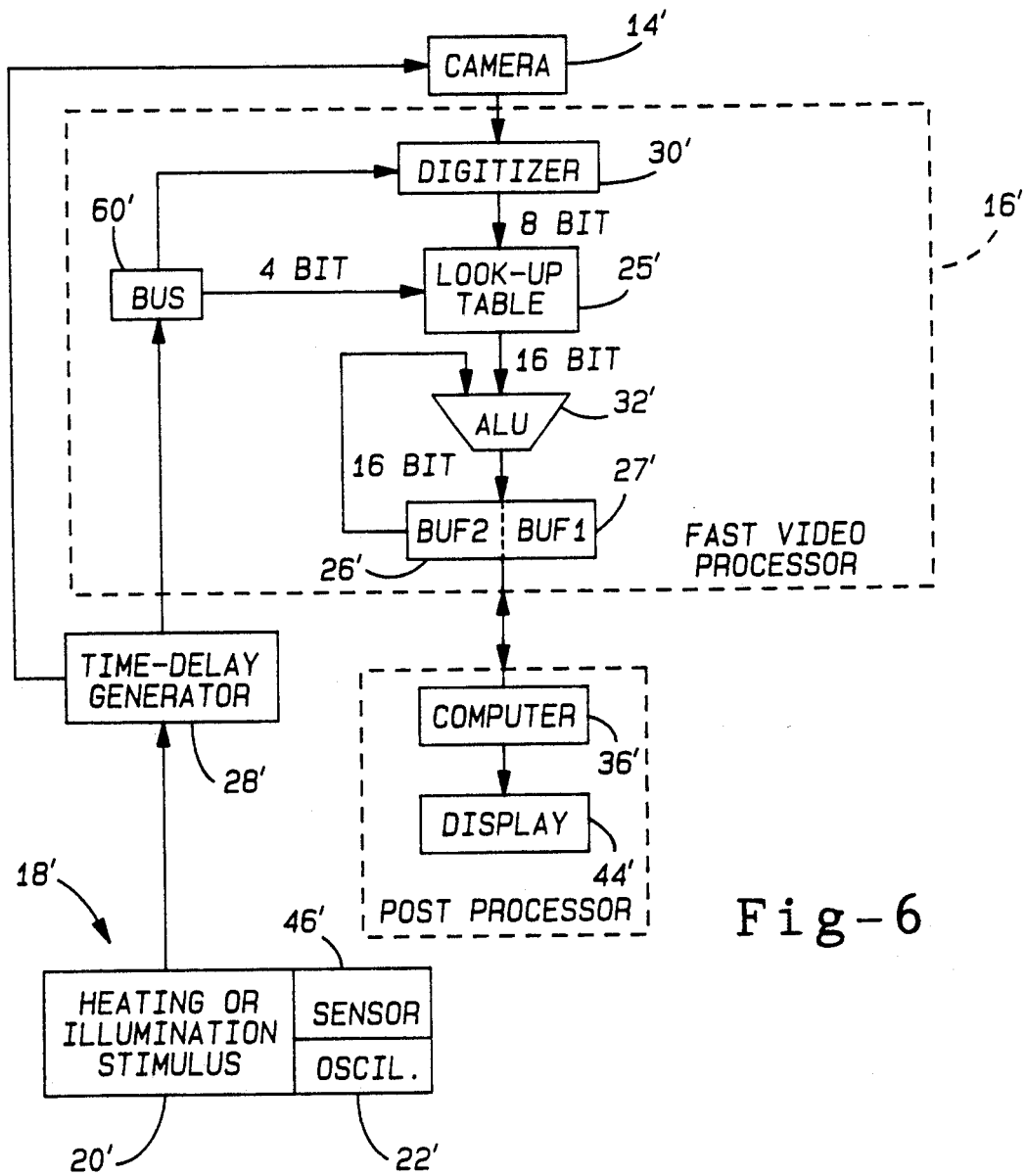
FIG. 6 is a block diagram of the second embodiment of the subject invention.

An imaging assembly 10, 10' for producing images synchronous with the periodicity of an object field 12 is generally shown in FIGS. 1 and 6. The imaging assembly 10, 10' produces images in synchronism with the time dependence, periodic or pulsed component of the object field 12, such that the images produced are of the synchronous component of the object field 12. The assembly 10, 10' requires that the portion of interest of the video signal be periodic, or quasi-periodic, and be capable of serving as a reference frequency for synchronization of the assembly 10, 10'. In some cases, this periodicity may occur naturally, e.g., blood flow driven at the pulse rate of the heart, or a running engine, lathe, etc. In other cases, the periodicity may be induced by an external stimulus, e.g., a modulated laser beam, flash lamp, modulated electric or magnetic field, or modulated electric currents. The assembly 10, 10' achieves, in parallel, and in real time, the effect of synchronous signal averaging for each of the pixels produced by the video camera 14. The advantage over the prior art imaging system is the resultant improvement in sensitivity while not relinquishing the advantage of real time imaging offered by the prior art assemblies.

The object field 12 to be imaged may be comprised of any field which is capable of generating its own periodic radiation or generating radiation in response to being externally, periodically stimulated. Examples of such applicability include: synchronous thermal wave imaging for nondestructive evaluation and manufacturing processes involving rotating machinery, etc.; diagnostic evaluation of semiconductor processing; synchronous detection of fluorescence resulting from modulated ultraviolet light used as an external stimulus useful in crime prevention, examination of objects of art, etc.

The assembly 10, 10' comprises two embodiments to acquire images of the synchronous component of the object field 12. A first embodiment 10 consists of a "box car" technique wherein a pulsed object field 12 is observed wherein each pixel of the image is operated on simultaneously and in parallel, and utilizes structure similar to the aforementioned U.S. Pat. No.4,878,116. A second embodiment 10' includes function similar to the "box car technique" and the lock-in technique disclosed in the aforementioned U.S. Pat. No. 4,878,116, however, the techniques are either partially or completely performed within and by the video camera 14'.

With respect to the first embodiment 10, the box-car video technique is functionally analogous to the operation of a single-channel box-car signal averager, and is structurally similar to the lock-in video technique described in U.S. Pat. No. 4,878,116 above, but it operates with object fields 12 with pulsed illumination or heating instead of the periodic stimulus used with the lock-in mode and frames of the data are therein operated. Where the lock-in continuously multiplies the video signal by the sine and cosine of the reference frequency, the box car technique multiplies the video signal by zero except in several narrow time windows, referred to as gates, which are at certain fixed time delays from the stimulus pulse, and during which the signal is multiplied by one or minus one rather than zero. The effect of these gates is to acquire several images corresponding to the states of the object field 12 at the predetermined fixed delay times after the pulse. These different delay times are analogous to the different phases, represented by the sine and cosine functions, of the periodic signal in the lock-in video technique. During the acquisition of the gated images, the images corresponding to different delay times are combined arithmetically by pixel-by-pixel subtraction, division, etc. to suppress nonsynchronous background effects. This is analogous to the subtraction that occurs in the video lock-in technique when the sine and cosine functions alternate in algebraic sign. Depending on the particular time scales involved, and on which particular version of the imaging assembly is being used, these arithmetic operations may either be performed in real time or delayed until after their storing and averaging as described below.

More specifically, the assembly 10 includes camera means 14 for detecting radiation from the object field 12 providing video and sync timing information which may be in the form of separate signals or may be in the form of composite video signals in which the video and sync timing signals are combined into one composite video signal. These signals comprise electrically the image of the object field 12 and include timing information of each frame of the image. The video signal comprises passive and active radiation. The passive radiation is that which occurs naturally, such as reflected radiation or the object's own emitted radiation. The active radiation is that resulting from external periodic irradiation of the object field 12 or that radiation internally generated by the object field 12. A conventional television camera or infrared camera 14, or other camera, may be used to obtain the image in analog form. In this embodiment, the camera means 14 produces a composite video signal wherein each line of a frame of the image is serially transmitted, and therefore the frames are serially transmitted. The camera means 14 repeatedly forms an image of the object field 12 and continuously produces the video signal comprising the data forming the image. The data forming one image comprise a frame and the composite video signal transmits images, frame after digitization a frame is 512×485 pixels. The frame is comprised of lines of pixels. In effect, the assembly 10 increases the number of channels of box-car or lock-in processing to that of the number of pixels in the video image, namely 248,320 in the preferred embodiment. Typically, twenty-five or thirty frames per second may be obtained by the camera 14. The timing information enables the processor means 16 to derive detailed information about the timing of each pixel of the image. This provides the mechanism for acquiring digital images in synchronism with the periodicity of the object field 12, as subsequently described.

Figure 2:
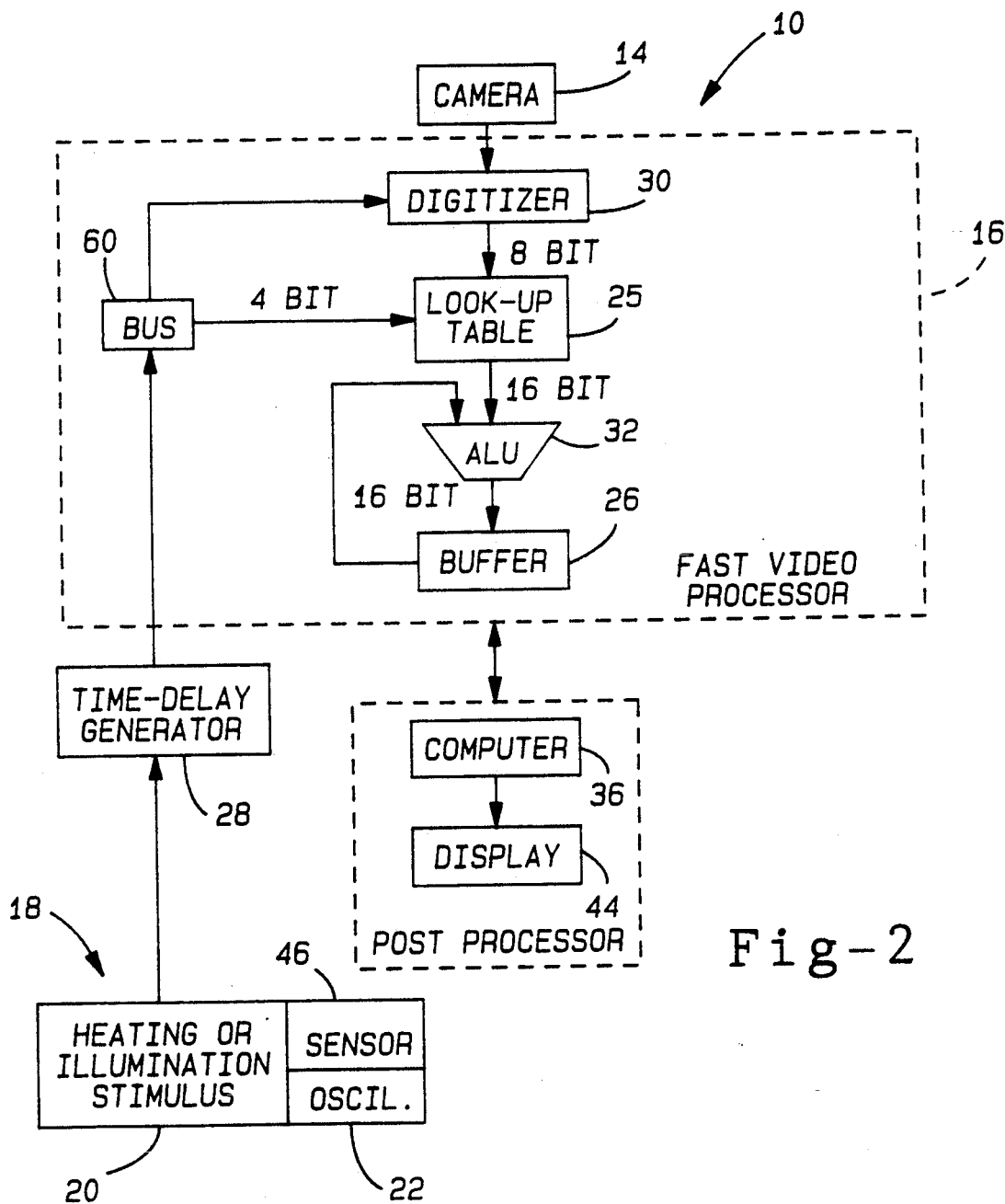
FIG. 2 is a block diagram of the first embodiment of the subject invention.

As more specifically shown in FIG. 2, the standard video signal from the IR camera 14 is fed to a video digitizer 30 which digitizes the video signal wherein each pixel is represented by eight bits of coding.

In the preferred embodiment, the object field 12 is externally periodically stimulated at a reference frequency, or the object field 12 which internally produces periodicity of the reference signal is utilized. The reference signal is indicative of the timing of the synchronous or repetitive pulse stimulus and the image is acquired at the predetermined delay times after each pulse. Stimulus control means 18 is included for externally stimulating the object field 12 at the reference signal frequency and for producing a reference signal representing the periodicity of the object field 12. The stimulus control means 18 may provide the periodicity by a pulsed laser beam, flash lamp, pulsed electric currents, or any other means directed at the object field 12 which will produce the requisite pulsed heating or radiation.

The stimulus control means 18 comprises stimulus means 20, e.g., heating or illumination, for stimulating the object field 12. The stimulus control means 18 also includes timing means 22 for repetitively controlling the stimulus means 20 to repetitively pulse stimulate the object field 12. The timing means 22 may be an oscillator controlling the stimulus means 20 to produce pulsed stimuli at a predetermined frequency. When the periodic signal is internal to the object field 12 and external stimulation is unnecessary, a sensor means 46 may be used to sense the periodicity of the object field 12 and produce the reference signal.

Figure 5:
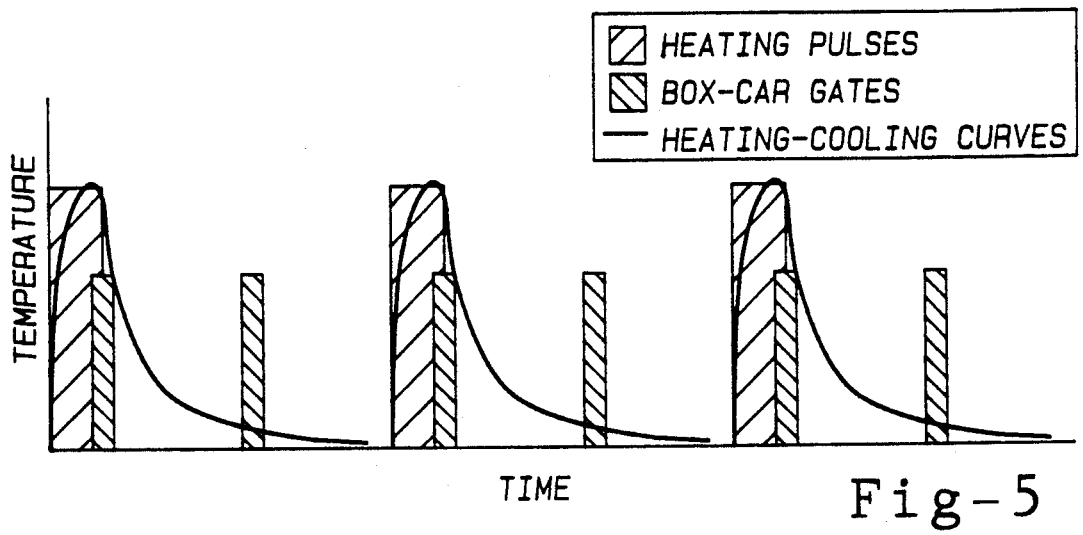
FIG. 5 is an example of the heating and cooling curves and gate times.

The use of the preferred embodiment is illustrated in the case of box-car thermal wave imaging with an IR camera 14. Upon application of the heating pulse, a heating curve and cooling curve for the object field 12 is sampled and produced as generally illustrated in FIG. 5. The optimum repetition rate of the heating pulses and the time delays before the predetermined box-car gates for the two frame windows are first determined by monitoring the heating and cooling curves for selected regions of interest on the object field 12 utilizing the subject processing system. Subtraction of the curves corresponding to different areas of the object field 12 yields the gate times for which the maximum contrast as between the defect region and the background is observed. In general, video frames are synchronously acquired in two time windows or gates, the first near that which was determined to give maximum contrast and the second near the tail of the cooling curve. In the simplest form, the second frame is subtracted from the first frame and accumulated which will, in effect, reduce the background variation in comparison to the thermal wave reflection from the subsurface defects of interest.

Depending on the repetition rate and heating and cooling curves for the object field 12, either a portion of a frame or number of frames may be obtained during the two gates. The repetition rate of the heating pulses is dependent upon the object field 12 because it must be matched to the characteristic thermal diffusion times of interest. The number of frames or portions of a frame acquired during a particular gate is dependent upon the time scale of the thermal diffusion. The number of lines or frames acquired during each gate is determined by the relative time scales of the heating and cooling curves of the sample relative to the frame time of the camera 14.

In some instances, the cooling time is very short and only a partial frame may be acquired during each gate. Thereafter, it would be necessary to acquire the remaining portions of the frame following subsequent heating pulses. Alternatively, if the heating and cooling curves extend for sufficient time periods, a plurality of frames may be obtained during each of the gates. In the latter case, the frames would be averaged and added to the storage buffer in the manner described herein before.

The assembly 10 includes processor means 16 for establishing the predetermined gates. The processor means 16 obtains the image in a given time window or windows after a fixed delay from the synchronizing or heating pulse. The processor means 16 receives the video signal and the timing signal to accumulate a frame of the image and average the frame with subsequent frames producing a box-car image representative of the average of the synchronous components of the object field 12. In this embodiment, the processor means 16 obtains a timing signal from the composite video signal produced by the camera 14, representing the time information of each frame or pixels thereof and receives the reference signal representing the periodic external stimulation or internally produced periodicity of the object field 12, as will be described subsequently. The processor means 16 receives the video signal and timing signal, and subtracts the video signal within the second gate from the video signal within the first gate to obtain the image synchronous with the periodicity of the object field 12.

In the case of subtraction, the time delay generator means 28 sends a signal to the fast video processor means 16 to establish a gate. In the first embodiment 10, the camera 14 is not directly connected to the time delay generator 28, however, in the second embodiment 10', the camera 14' is connected to the time delay generator 28. The digitizer 30 provides each pixel with a binary representation and the time delay generator means 28 attaches four additional bits which is representative of the time delay. When the signals are received by the video processor, the processor 28 switches among three look-up tables, one of which multiplies the incoming video signal by zero, the other by one, and the third by negative one, in a programmed fashion. During the time of the first gate, the video signal is multiplied by $+1$, during the second gate by $-1$, and elsewhere by zero. Once the table is selected, the address represented by the digital signal obtains the product of the multiplication by $+1$, $-1$, 0. The resulting image is accumulated in a 16-bit image buffer 26 and constitutes the box-car image, suitable for post-processing and display by the computer means 36. It can be understood that the box-car video image will contain the synchronous components having the periodicity of the object field 12.

The 16-bit buffer means 26 is used to accumulate the box-car video image from the output of an arithmetic logic unit (ALU) 32.

The processor means 16 includes the arithmetic logic unit (ALU) 32 for receiving the newly acquired digitized data and for adding and averaging same with the buffer means 26. The ALU 32 receives the newly acquired digitized data receives the commands from the time-delay generator means 28, and receives the previously stored image signal from the buffer means 26 to achieve addition and multiplication thereon to average the image data and replace the previously stored data with the newly averaged image data in the buffer means 26.

The 16-bit input to the ALU 32 from the look-up table (LUT) 25 is either positive, zero, or negative, depending upon the gates received from the time delay generator means 28 over the timing control buss 30, which determine the state of the (LUT) 25. The ALU 32 receives subsequent video signals and merges same with the image already resident in the buffer means 28 and stores the resulting averaged image therein. Any number of repetitions of this two gate sequence can be utilized, up to the number at which the resulting image begins to overflow in the 16-bit buffer means 26. In the case where the response time of the object field 12 is fast and the repetition frequency is chosen to be higher than the frame rate, the number of repetitions must be such as to allow the gate windows to move through the entire frame during the accumulation period. When the response time is long, the gates are chosen to contain an integral number of frames for convenience. In the latter case, typically sixteen pulse repetitions are used, and the delay time between the two gates is typically set to a few frame times, tens of milliseconds, up to several seconds, depending upon the response time of the sample. In either case, the difference between the image corresponding to gate 1 and that corresponding to gate 2 is continuously accumulated as a 16-bit box-car video image in the buffer means 26, ready for video output, post-processing and permanent storage by the computer means 36, and display by the display means 44. It is to be understood that each complete frame is composed of individual pixels, each of which may be associated with a known delay time from the initiation of the stimulus pulse. Each pixel is operated on individually by the processor means 16 and is stored in its appropriate image location in the buffer means 26.

The assembly 10 also includes controller means 36 connected to the processor means 16 for conducting post-processing or selectively receiving the images stored within the buffer means 26. The controller means 36 may perform a variety of image post-processing functions upon the images.

The controller means 36 controls the time delay generator means 28, as well as the processor means 16, to determine the time delay of each pixel or frame from the heating pulse in order to make a determination of whether the pixel or frame falls within one of the two gates. The delay means 28 transmits the time delay to the look-up table 25 of the processor means 16 which in turn makes a determination of the gate within which the frame or pixel falls. As previously stated, a frame or a pixel may be associated with a given time delay.

The assembly 10 includes converter means 42 for receiving the image signal from the controller means 36 to convert the digital signal to an analog display signal for the visual display thereof. The converter means 42 is not necessary when a digital display signal is suitable.

The assembly 10 also includes display means 44 for receiving the analog or digital display signal and for displaying the synchronous image of the object field 12. Any display or terminal capable of graphics may be utilized.

Alternatively, two buffers 26 may be utilized to acquire images from an additional two gates after the heating pulse. After acquiring subtracted images in two buffers 26, the controller means 36 may perform a division of the two buffers 26 to obtain a ratio to eliminate the effects of variations in reflectivity and/or emissivity in the object field 12.

The method supports either assembly 10, 10' and move specifically includes the steps of producing a reference signal indicating the occurrence of a synchronizing pulse representing the periodicity of the object field 12, detecting radiation from the object field 12 producing a video signal of the image, producing a timing signal associated with the video signal, receiving the reference signal and timing signal and determining the delay time of the video signal from the synchronizing pulse, producing a heating and cooling curve based on the thermal characteristics of the object field 12 to establish two gates for two images, acquiring a first image at a first time delay from the synchronizing pulse including synchronous and unsynchronous image components, acquiring a second image at a second time delay from the synchronizing pulse including unsynchronous image components, receiving and comparing the delay time with the gates and producing a product signal, subtracting the second image from the first image to produce an image signal representing the image synchronous with the periodicity of the object field 12, accumulating and storing the image, receiving the product signal and averaging same with the stored image, multiplying the video signal by one when within the first gate, multiplying the video signal by negative one when within the second gate, and multiplying the video signal by zero when not within the two gates, acquiring a frame of the image comprising pixels and subtracting the second frame from the first frame to effect parallel processing of each pixel.

Figure 3:
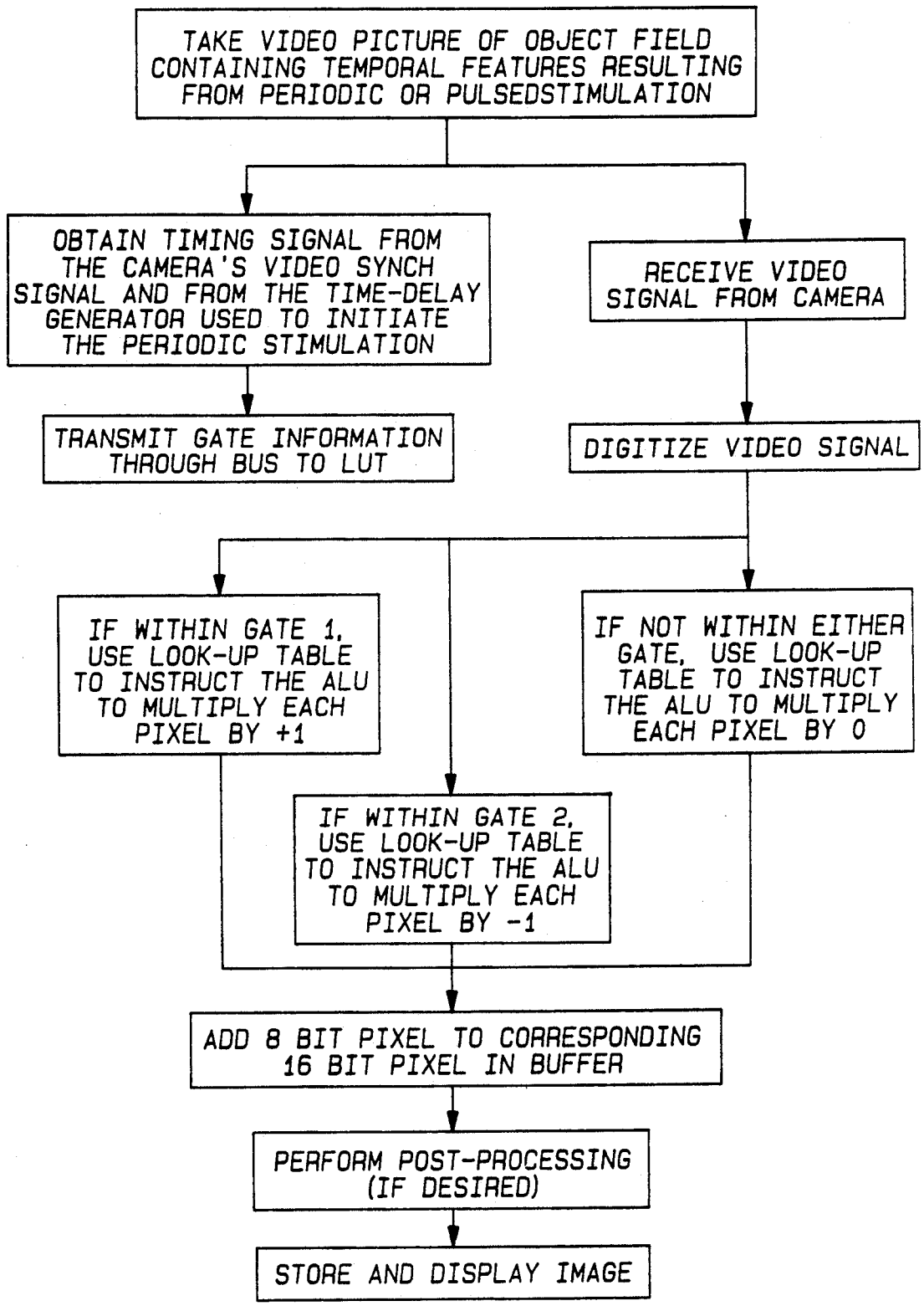
FIG. 3 is a flow chart of the subject invention.

The method of the subject invention is illustrated in the flow chart of FIG. 3. A video signal of the object field 12 containing temporally periodic features is obtained by the camera 14. The first branch of the flow chart represents a circuit that receives the video signal, obtains timing signals from the video signal and the reference signal, determines the delay time for the pixels or frame from the heating pulse, and then transmits the delay information to the LUT 24. The data are multiplied by zero, positive or negative one operands and the result is merged with the 16-bit data in the buffer 26.

Figure 4:
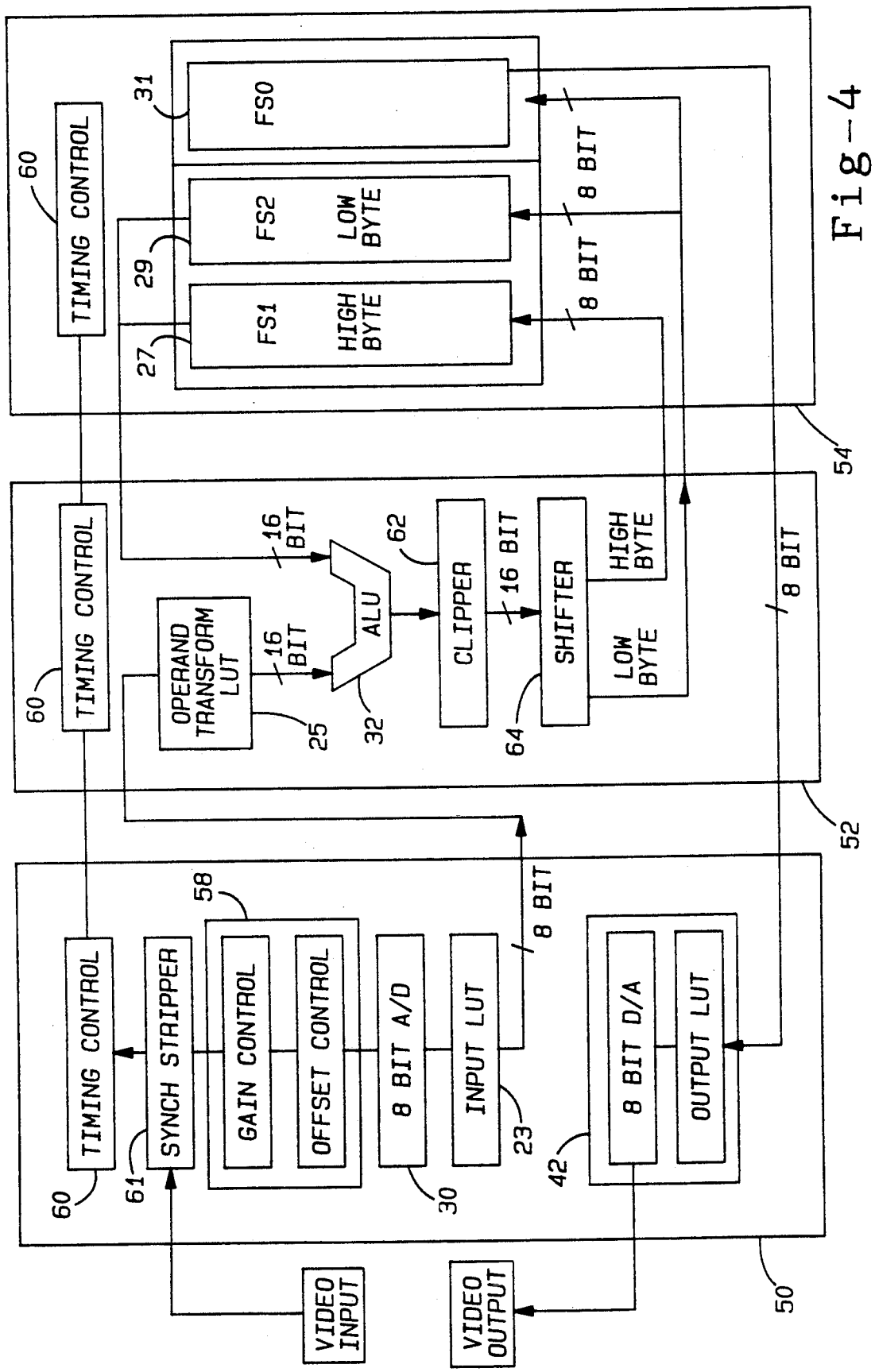
FIG. 4 is a schematic diagram of the processor means.

As illustrated in FIG. 4, the digitizer 30 and converter 42 reside on a first board 50, and the processor means 16 consists of three boards 50, 52, 54, all connected with a data and control bus 60. The boards 50-54 are manufactured by Datacube, Inc. The controller means 36 and display means 44 are implemented by the Sun 3/160C color workstation for controlling the assembly 10 and post-processing of the images. The board 52 is a general purpose processing module and is used for merging and averaging the images at the two gates and the image buffer board 54 is used for the accumulation and storage of the images. The processing board 52 is capable of multiplying, accumulating and shifting image data in a pipeline fashion with a 10 MHz throughput. The image buffer board 54 is 512×512 pixels and is 16-bit deep. Each memory input is a read-and-modify operation, in order to allow accumulation of the data corresponding to each pixel in the same memory location. The pipe-line delay is compensated for by using a pan operation (an increment of the horizontal base register by a count equal to the pipe-line delay at the pixel rate) at the beginning of each vertical trace. The controlling program resides in the Sun workstation 36, 44. All the image processing boards 50-54 reside on a VME bus and are housed in a separate card cage which is connected to the workstation's VME bus by bus extension boards. All real-time image processing is handled by the Datacube boards 50-54.

The first board 50 receives the input RS-170 analog video signal and a sync stripper 61 derives the master timing signal to synchronize all the boards 50-54 thereto. The remaining analog video signal is filtered and amplified or reduced via the gain and offset control 58 before it is sent to the digitizer 30 comprising 8-bit A/D (analog to digital) converter. The resulting digitized video signal is a 10 MHz stream of sequential data. These data are transformed by a Look-up table (LUT) 25 by receiving the time delay from the timing control bus 60. The processing board 52 receives the time delay information, processes the data, and puts out a 16-bit modified signal from the operand transform LUT 25. The signal is combined with the 16-bit data previously accumulated in the storage board 54 using the arithmetic logic unit (ALU) 32, clipper 62 and shifter 64. The signal from the ALU 32 is sent back to the storage board 54 replacing the previously accumulated data, and the entire process is repeated until an appropriate number of averages have been carried out. The storage board 54 is capable of storing three (512×512×8-bit) frames of digital video information. The 16-bit image data are stored using two 8-bit image buffers 27, 29 (high byte and low byte). The processing means 16 can perform temporal and spatial filtering, image merging, image subtraction, and addition, and/or other simple arithmetic operations in real time. An output buffer 31 converts the 16-bit stored image to 8-bits and the converter 42 includes an output look-up table for receiving the 8-bits and shifting to get best contrast of the image, which an D/A converts to analog.

The processed images are transferred to the color workstation or controller means 36. The image data that are transferred to the controller means 36 are in the 8-bit format. These data are obtained from the 16-bit image data by selecting an 8-bit image window with optimum contrast, but without overflow of the data. The image is displayed with a color map software system.

The method supports both embodiments of the assembly 10, 10' and more specifically includes the steps of producing a reference signal indicating the occurrence of a synchronizing pulse representing the periodicity of the object field 12, detecting radiation from the object field 12 producing a video signal of the image, producing a timing signal associated with the video signal, receiving the reference signal and timing signal and determining the delay time of the video signal from the synchronizing pulse, producing a heating and cooling curve based on the thermal characteristics of the object field 12 to establish two gates for two images, acquiring a first image at a first time delay and within one gate from the synchronizing pulse including synchronous and unsynchronous image components, acquiring a second image at a second time delay and within the second gate from the synchronizing pulse including unsynchronous image components, receiving and comparing the delay time with the gates and producing a product signal, multiplying the video signal by one when within the first gate, multiplying the video signal by negative one when the second gate, and multiplying the video signal by zero when not within the two gates, subtracting the second image from the first image to produce an image signal representing the image synchronous with the periodicity of the object field 12, accumulating and storing the image, receiving the product signal and averaging same with the stored image, acquiring a frame of the image comprising pixels and subtracting the second frame from the first frame to effect parallel processing of each pixel.

In the second embodiment 10', a portion of the synchronous imaging is performed in the camera 14', 14'', 14''' prior to the data's being transmitted thereout as indicated in FIG. 6. Such a system may be adapted both to the box-car imaging described herein before, and to the lock-in imaging disclosed in U.S. Pat. No. 4,878,116 incorporated by referring herein. Like numbers (primed) in FIGS. 6-10 correspond to the structure illustrated in FIG. 2 and functions similarly with differences identified hereinafter.

There are three subembodiments of the camera 14', 14'', 14''' of the second embodiment of the assembly 10, The subembodiments 14', 14'', 14''' differ in their details depending on the nature of the video camera which is used to acquire the image.

As common to all subembodiments, the imaging assembly 10' comprises stimulus control means 18' for producing a reference signal indicating the occurrence of a synchronizing pulse or series of pulses representing the periodicity of the object field, time-delay generator means 28, for triggering the camera 14', 14'', 14''' at appropriate phase or time delays from the reference signal, and gateable camera means 14', 14'', 14''' for detecting visible or infrared radiation from the object field 12 producing a video signal of the image. Also included is real-time image processor means 16' and control means 36', 44' consisting of a computer or workstation for storage and display of images.

In the second embodiment 10', the reference signal is derived either from a digitizer 30' within the real-time processor 16' or from an external reference 18', but is always synchronized with the stimulus of the object field 12. The reference signal is sent to the time delay generator 28' together with the camera's 14', 14'', 14''' sync timing pulses (stripped from the video signal by the real-time processor) to generate a signal to control the camera's operation. The camera 14', 14'', 14''' merges that signal with the video data as the data are being recorded in such a way as to imprint the video signal with the reference information. This imprinting accomplishes the first part of the lock-in or box-car operation, namely the multiplication of the data by the sine or cosine in the lock-in technique, or by zero or one or minus one in the box-car technique. The imprinted video stream is then sent out of the camera 14', 14'', 14''' to the real-time processor 16' which digitizes, and, in response to the timing of the video sync pulses, separates the different in-phase, quadrature, etc. image components, sends them to the appropriate image buffers, and averages them. When the averaging is complete, the resultant images are sent to the control means 36', 44' for storage and display.

As described above, the subembodiment depends on the nature of the camera 14', 14'', 14''' being used. The first subembodiment 14' includes the switching of an electronic shutter or image intensifier in such a way as to control the light coming into the camera 14, in synchronism with the reference. The second subembodiment includes the switching of the detector array in the camera 14'' such as to alternately render it sensitive or insensitive to the incoming light in synchronism with the reference, thus accomplishing the same net effect as the first subembodiment. The third subembodiment 14''' includes the switching of a set of current mirror circuits, one for each pixel of the image, manufactured into the detector array in such a way as to alternately charge and discharge the integrating capacitors in the array, again in synchronism with the reference.

Figure 7:
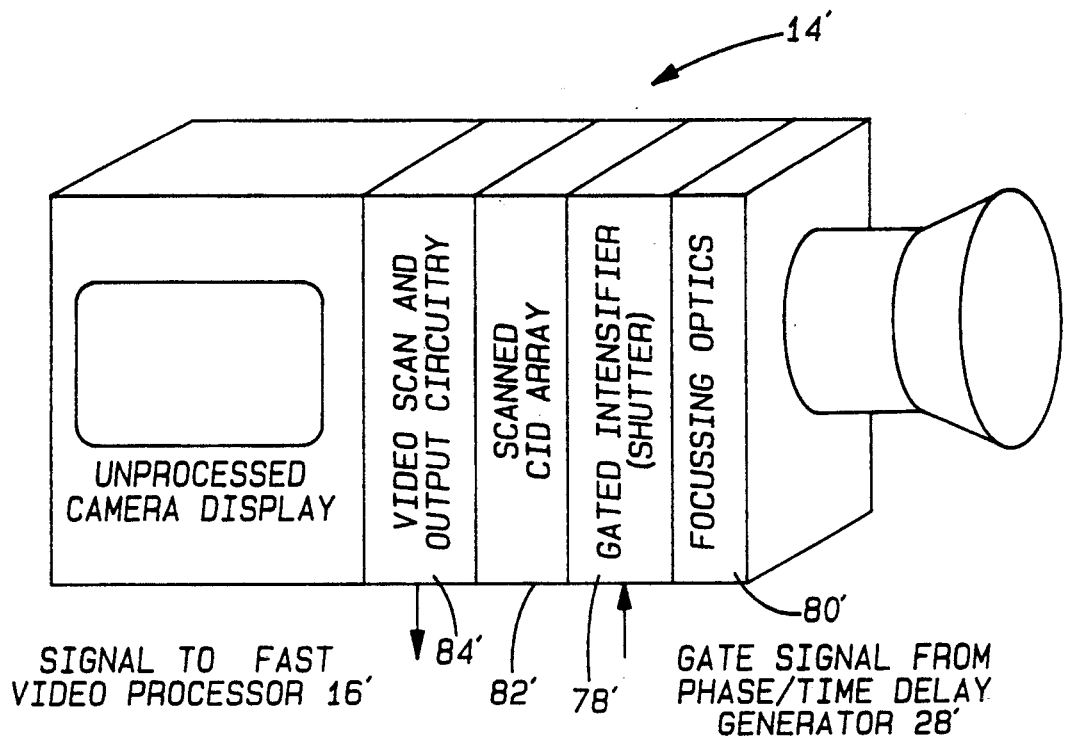
FIG. 7 is a schematic diagram of the first subembodiment of FIG. 6 utilizing a gated intensifier or shutter.

In the first subembodiment 14' illustrated in FIG. 7, of the assembly 10', a camera 14' (ITT 4573) is used with a built-in image intensifier 78' which can act either as a variable intensifier or as an electronically controllable shutter. In general, the camera 14' includes focussing optics 80' for receiving the light from the object field 12, a gated intensifier 78' for establishing the synchronism and imprinting the light, a scanned CID (charge injected device) array 82' for detecting the light, and video scan and output circuitry 84' for producing the analog video image signal. The operation of the camera 14' is first described as if it were being used as a 1 MHz lock-in imager. In this case, the incoming reference signal will be a 1 MHz sine or square wave generated either by the stimulus control means 18' or by a digitizer 30' in the fast video processor 16'. Since the digitizer 30' is locked to the camera 14', a 1 MHz reference signal derived from it will be synchronous with the camera's frame scan. In this case the lock-in operation is totally synchronous because the reference is synchronized, not only with the object field 12, but also with the camera's scan. If an external control means 18' is used, then the scan of the camera 14' and the reference will be asynchronous, but the reference and the periodicity of the object field 12 will still be synchronous. In either case, the time delay generator 28' accepts the 1 MHz reference signal and generates three additional signals from it, each one shifted 90° in phase from the previous one. The result is four synchronous 1 MHz signals shifted in phase from the object field's stimulus by 0°, 90°, 180°, and 270°. The time delay generator 28' then uses the camera's sync signals to multiplex these signals at a submultiple of the video frame rate, for example switching on every 10th frame, and sends the multiplexed signal to the camera 14'. This signal is then used to control the gain of the intensifier 78', thus imprinting four sequential series of 10 frames each with the 1 MHz signal shifted by one of these four phases. Thus, for example, series #1 might be imprinted with the 0° signal, series #2 with the 90° signal, series #3 with the 180° signal, and series #4 with the 270° signal. At this point it is important to recognize that the camera 14' contains an array of detectors 82', one for each pixel of the image, all operating in parallel, and all active for the entire frame time. Hence the imprinting takes place continuously and in parallel for each pixel of the image. The result is that each frame, which takes 1/30 of a second, contains an image each pixel of which has been integrated, or equivalently averaged, over a large number (1/30 × 1,000,000 in our 1 MHz example) of cycles of the reference/stimulus periodicity. This pixel-by-pixel averaging is a significant fraction of the processing necessary to produce a lock-in image. The remaining fraction is performed in the fast video processor 16' to which the imprinted signal is sent next.

When the imprinted signal is received by the processor 16', each series of frames is averaged and stored in one of two buffers 26', 27' in a pattern to be explained below, except that the first frame acquired after the switching of the phase of the reference is discarded. In our 10-frame series example the pattern of averaging and storage is as follows: Frame 2 through 10 of the 0° series would be averaged and stored in the first buffer 26'. Then frames 2 through 10 of the 90° series would be averaged and stored in the second buffer 27'. This is followed by the similar averaging of the last nine frames from the 180° series, but these frames are not stored in a separate buffer. Instead, they are averaged into the first buffer 26' together with the 0° series, but with a negative sign. At this point the first buffer 26' contains a complete in-phase lock-in image. The subtraction is necessary for complete lock-in operation because, while the intensifier 78' in the camera 14' can be controlled by a sine wave voltage, it cannot subtract an image. There is no such thing as negative intensification. Therefore the subtraction must be done outside the camera 14' by the fast video processor 16'. The complete quadrature image is obtained by a nine frame average and subtraction of the 270° series from the 90° series previously stored in the second buffer 27'. At this point the two buffers 26', 27' contains the two components of a complete vector lock-in image of the object field ready for transfer to the workstation for 36', 44' storage and display.

The effective time constant, or integration time, of the lock-in is a combination of the integration time in the camera 14' and the number of frames averaged in the processor 16'. In the 10-frame example used above, it is 1/30 second × 1 MHz × 9 frames 300,000 cycles of the object field's periodicity. This is accomplished in parallel for each pixel of the image in a total time of 40 frames × 1/30 second/frame = 1.33 seconds, or 0.67 seconds for each in-phase or quadrature image. Considerably faster speeds are possible if less averaging is needed.

Figure 8:
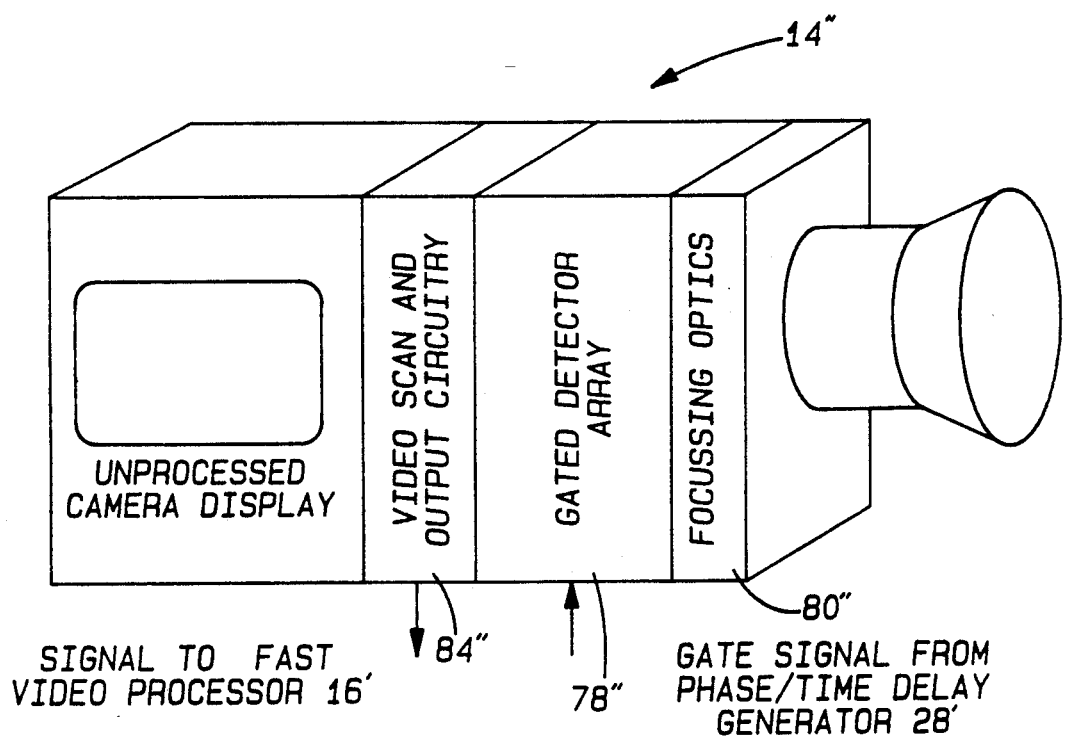
FIG. 8 is a schematic diagram of the second subembodiment of FIG. 6 utilizing a gated detector array.

The second subembodiment of the imaging assembly uses a camera 14'' illustrated in FIG. 8 with a gated detector array 78'' which can be controlled by the external reference signal. This subembodiment differs from the first subembodiment only in that it is the sensitivity of the detector 78'' which is modulated at the reference frequency, rather then the intensity of the incoming light. The remainder of the assembly's operation is the same as above and will not be described further here. Common structure and reference numerals are utilized to identify common structure and function, wherein the primes indicate subembodiment.

Figure 9:
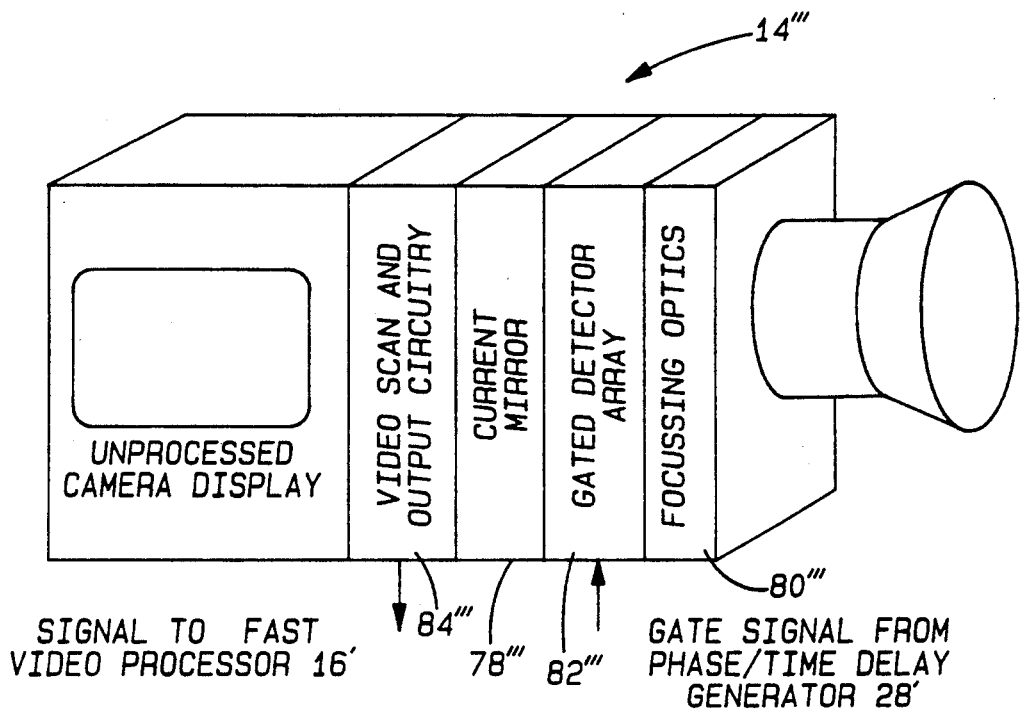
FIG. 9 is a schematic diagram of the third subembodiment of FIG. 6 utilizing a current mirror which is built into each pixel of the detector array.
Figure 10:
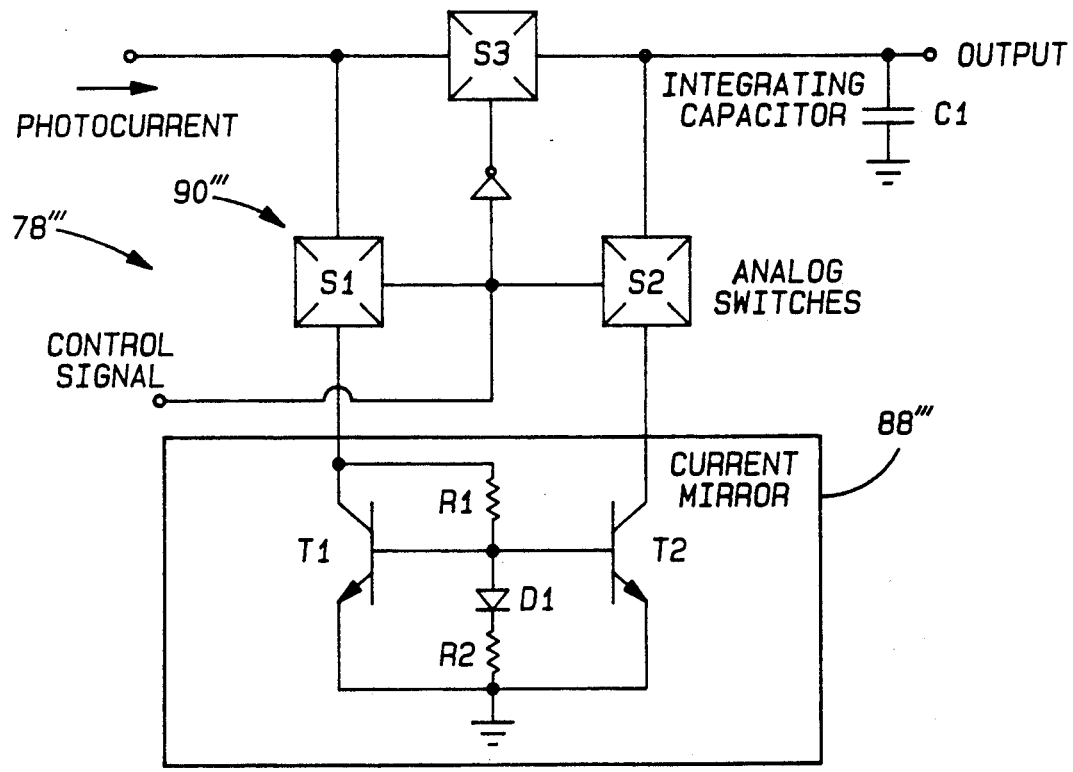
FIG. 10 is a diagram of the current mirror circuit.
Figure 11:
FIG. 11 is an optical image of a circuit breadboard with an LED flashing at 25 MHz, the LED is too dim to be seen in this image.
Figure 12:
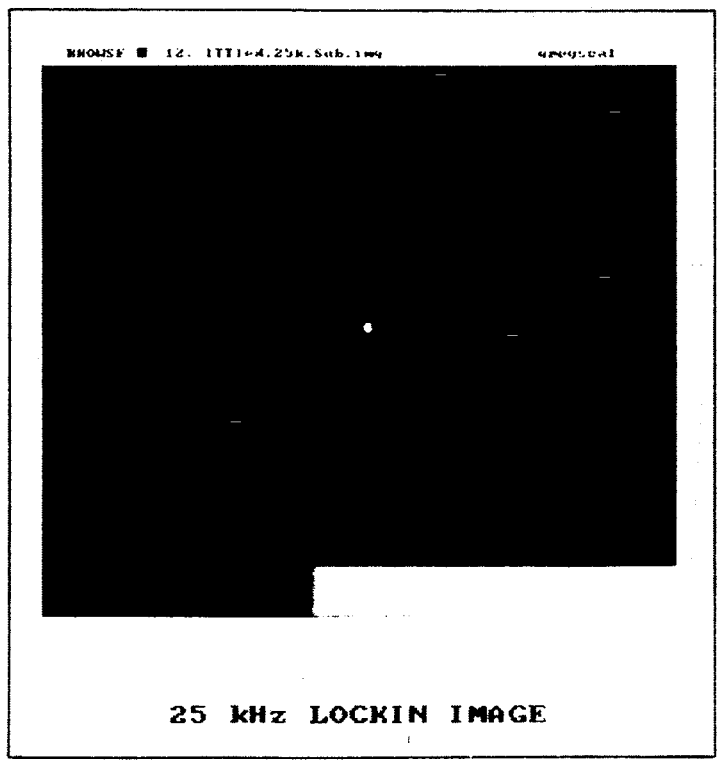
FIG. 12 is a 25 MHz in-phase lock-in image of the circuit board shown in FIG. 11. This image was made using the first subembodiment. Note that only the LED is visible in the lock-in image.
Figure 13:
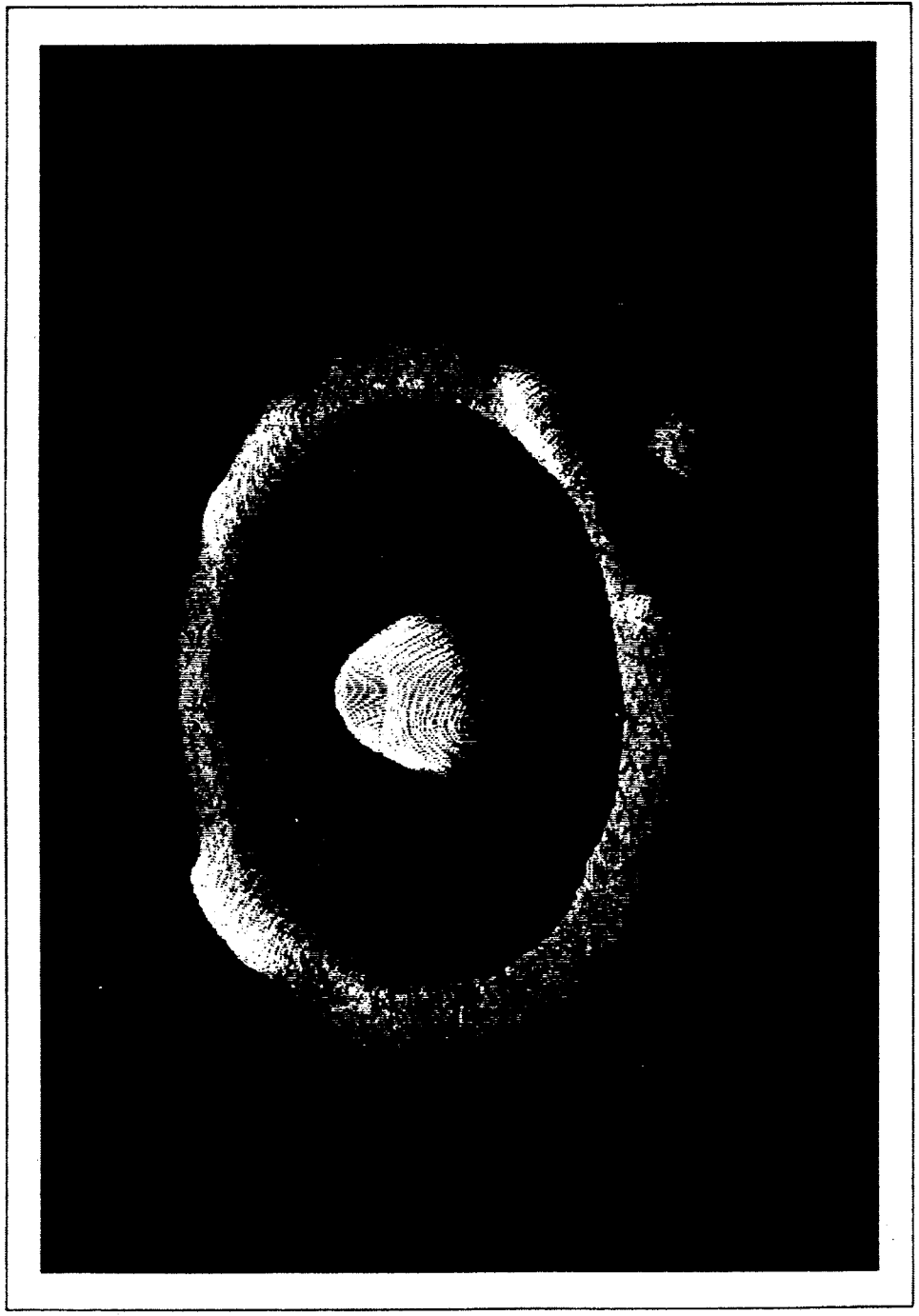
FIG. 13 is a perspective plot of a box-car infrared thermal-wave image of a piston cap showing subsurface defects in the ceramic coating. The defects are the areas that appear raised and white in the plot.

The third subembodiment 14''' illustrated in FIG. 9 differs from the first and second embodiments in that it uses a camera 14''' in which subtraction can take place in the camera 14'''. This removes the necessity for the use of the 180° and 270° phases of the reference, thus cutting the image acquisition time in half. However, this change has a more important function in that it increases the dynamic range of the assembly 10', and at the same time performs all of the lock-in functions in the camera 14'''. This type of camera 14''' requires a custom detector array in which a so-called "current mirror" circuit 78''' (or equivalent) and a set of analog switches 90''' are interposed between each of the photodetectors in the array 82''' and the capacitor which stores the photocurrent. One version of the current mirror circuit 78''' and the necessary switches 90''' are indicated schematically in FIG. 10. The actual current mirror 78''' consists of the two transistors T1, T2, two resistors R1, R2, and a diode D1. The operation of this circuit is controlled by an external signal through three switches S1, S2, and S3. The circuit is arranged so that when S1 and S2 are turned on, S3 is turned off and vice versa. In the camera 14''', during the positive half cycle of the reference frequency S1 and S2 are off and S3 is on. The photocurrent then charges the integrating capacitor C1 in the same fashion as it would if the current mirror were not present. During the negative half cycle of the reference frequency, S3 is off and S1 and S2 are on. This switches the photocurrent to the transistor T1 where it passes from the collector to the emitter to ground, except for a small fraction which passes through the resistor R1 to supply the base currents for both T1 and T2. With this configuration, the current in the collector of T2 is equal to that in the collector of T1. Thus T2 "mirrors" T1. However, since S2 is now open, the collector current in T2 discharges the integrating capacitor, effectively accomplishing the subtraction which is required during the negative half cycle of the lock-in. At the same time, this circuit greatly increases the dynamic range of the system, because any dc photocurrent (which would correspond to a dc background in that pixel of the image) is alternately added to, and subtracted from, the charge on the capacitor and is therefore cancelled out. In the other two subembodiments of the system, the current can only add to the charge, and a large dc background can cause saturation of the system.

Except for the absence of the 180° and 270° phases, the control of the system by the time delay generator 28' is the same as in the previous two subembodiments. In addition, the real-time processor 16' only does averaging without any subtraction, since the 0° series of frames automatically gives the in-phase image and the 90° series automatically gives the quadrature image with no further subtraction. It is still necessary to discard the frame corresponding to the switch from one phase to the other.

The three subembodiments 14', 14'', 14''' may also implement the box car technique. The stimulus applied to the object field 12 is a series of short pulses with relatively long time delays therebetween, as opposed to the regular 50% duty cycle of the sine or square waves used in the lock-in technique. The time delay generator 28' then functions to generate short data-acquisition gate windows during which the camera 14', 14'' is actively taking data, i.e., the incoming data are effectively being multiplied by 1, while at all other times the camera 14', 14'' is not taking data, i.e., the data are being multiplied by zero. The gates may have any appropriate width in time, and may have any specified delay after a given stimulus pulse. The video data acquired in each gate window may correspond to a complete image or to a fraction of an image, depending on the choice of gate width. In the latter case, it is necessary to shift the timing of successive stimulus pulses relative to the beginning of the camera's frame in such a way that a sequence of pulses completely fill the video frame with data. Frames corresponding to the same gate width and delay time are averaged by the processor 16', and stored in a buffer 26' in a fashion analogous to the handling of one phase of the lock-in. The data acquired during the first gate are received and directly averaged in the buffer 26'. However, the data acquired during the second gate must be processed by the LUT 25' in order to be multiplied by the minus one ($-1$). Images corresponding to different gates are then combined by subtraction, to remove the asynchronous background. For the case of camera 14''', incoming data within the first gate are multiplied by one ($+1$) data within the second gate are multiplied by minus one ($-1$), and elsewhere the data are multiplied by zero, so that the subtraction is carried out completely in the camera 14''' with the same advantages thereof as described previously for the lock-in. The advantage of the "in-camera" imaging is that complete frames of data are acquired and operated on in parallel to increase acquisition speed.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method for producing images synchronous and in-phase with the periodicity of an object field (12) utilizing a video camera (14, 14', 14'', 14''') for producing a video signal comprising frames of the image, the method including the steps of; producing and directing a synchronous reference signal to the object field causing the periodicity of the object field (12), detecting radiation from the object field (12) for producing a video signal of the full image at a set time, acquiring a first full image at a predetermined first time delay from the synchronizing pulse including in-phase and active image components and passive background image components, acquiring a second full image at a predetermined second time delay from the synchronizing pulse including substantially only passive background image components, and subtracting the second full image from the first full image to produce an image signal representing the active image synchronous and in-phase with the periodicity of the object field (12).

2. A method as set forth in claim 1 further characterized by producing a timing signal associated with the video signal.

3. A method as set forth in claim 2 further characterized by receiving the reference signal and timing signal and determining the delay time of the video signal from the synchronizing pulse.

4. A method as set forth in claim 3 further characterized by producing a heating and cooling curve based on the thermal characteristics of the object field to establish two gates for two images.

5. A method as set forth in claim 4 further characterized by receiving and comparing the delay time with the gates and producing a product signal.

6. A method as set forth in claim 5 further characterized by accumulating and storing the image.

7. A method as set forth in claim 6 further characterized by receiving the product signal and averaging same with the stored image.

8. A method as set forth in claim 7 further characterized by multiplying the video signal by one when within the first gate, multiplying the video signal by negative one when in the second gate, and multiplying the video signal by zero when not within the two gates.

9. A method as set forth in claim 1 further characterized by acquiring a frame of the image comprising pixels and subtracting the second frame from the first frame to effect parallel processing of each pixel.

10. An imaging assembly for producing images synchronous and in-phase with the periodicity of an object field, said assembly comprising: stimulus control means (18) for producing a reference signal indicating the occurrence of a synchronizing pulse representing the periodicity of the object field; camera means (14) for detecting radiation from the object field (12) producing a video signal of the image and a timing signal for the video signal; processor means (16) for acquiring a first video signal at a first time delay from said synchronizing pulse including active and in-phase components and passive image components and for acquiring a second video signal at a second time delay from said synchronizing pulse including substantially passive background noise, and for subtracting said second video signal from said first video signal to produce an image signal representing the image in-phase and synchronous with the periodicity of the object field (12); said controller means including delay means (28) for receiving said reference signal and said timing signal and determining said delay time associated with said video signal.

11. An assembly as set forth in claim 10 further characterized by said controller means including delay means (28) for receiving said reference signal and said timing signal and determining said delay time associated with said video signal.

12. An assembly as set forth in claim 11 further characterized by including means for producing a heating and cooling curve based on thermal characteristics of the object field to establish two gates for two images.

13. An assembly as set forth in claim 12 further characterized by said processor means (16) including look-up table means (25) for receiving and comparing said time delays with said two gates and producing a product signal.

14. An assembly as set forth in claim 13 further characterized by said processor means (16) including buffer means (26) for accumulating and storing the image.

15. An assembly as set forth in claim 14 further characterized by said processor means (16) including arithmetic means (32) for receiving the video signal from the look-up table means (25) and averaging same with the image stored in said buffer means (26).

16. An assembly as set forth in claim 15 further characterized by said stimulus control means (18) comprising stimulation means (20) for stimulating the object field (12) by producing periodic stimulus pulses on the object field (12).

17. An assembly as set forth in claim 16 further characterized by said stimulus control means (18) including timing means (22) for controlling said stimulation means (20) to successively pulse stimulate the object field (12).

18. An assembly as set forth in claim 17 further characterized by including digitizer means (30) for digitizing said video signal comprising pixels wherein each pixel is represented by 8-bits of coding.

19. An assembly as set forth in claim 18 further characterized by including converter means (42) for receiving the image signal from said processor means (16) for converting same into analog display signal for the visual display thereof.

20. An assembly as set forth in claim 19 further characterized by including display means (44) for receiving said analog display signal and visually displaying same.

21. An assembly as set forth in claim 20 further characterized by said video signal comprising a series of pixels representing a frame of the image of the object field (12) and said camera means (14) producing a timing signal for each of said frames, and said processor means (16) subtracting frames of the image for parallel processing of each pixel.

22. An imaging assembly for producing images synchronous and in-phase with the periodicity of an object field, said assembly comprising: stimulus control means (18,) for producing a reference signal representing the periodicity of the object field (12); camera means (14', 14", 14''') for detecting radiation from the object field (12) producing a video signal of the image and timing signal; delay generator means (28') for receiving said reference signal and said timing signal and for producing a control signal representative of the synchronism between said reference signal and said timing signal; and characterized by said camera means (14', 14", 14''') including adjustment means for receiving said control signal and for receiving the radiation to produce electrically a frame of the image comprised of a plurality of pixels having a magnitude component proportional to the synchronism.

23. An assembly as set forth in claim 22 further characterized by said camera means (14', 14", 14''') including focussing optics for receiving and focussing the radiation to said adjustment means, and output circuitry for scanning said adjustment means and producing said video signal comprising said pixels of said frame as serial output.

24. An assembly as set forth in claim 23 further characterized by said adjustment means including a gated intensifier (78') for changing the gain of the received radiation by a factor dependent upon the synchronism, and scanned charged injected device (82') for electrically imprinting the gain adjusted radiation thereon to produce the frame.

25. An assembly as set forth in claim 23 further characterized by said adjustment means including a gated detector array (78") for changing the intensity of the received radiation by a factor dependent upon the synchronism and imprinting same electrically as the frame.

26. An assembly as set forth in claim 25 further characterized by said adjustment means including a gated detector array (82''') for receiving the radiation and converting same to electrical signal for each pixel, and a current mirror circuit (78''') for changing the magnitude of the pixels and summing subsequent frames therewith to produce a video signal wherein the image comprises synchronous components of the object field (12).

27. An assembly as set forth in either of claims 24 or 25 further characterized by said reference signal comprising a synchronizing pulse, and said delay generator means (28') turning on said adjustment means (78', 78") allowing radiation to be received within two gates, a first of said gates at a first delay time from said synchronizing pulse producing an image including synchronous and unsynchronous image components and a second of said gates at a second time delay from said synchronizing pulse producing an image including substantially unsynchronous image components, and for turning off said delay generator means (28') preventing light from being received at times other than said gates.

28. An assembly as set forth in claim 27 further characterized by said delay generator means (28') determining the delay time associated with the video signal from the reference signal.

29. An assembly as set forth in claim 28 further characterized by including means for producing a heating and cooling curve based on thermal characteristics of the object field to establish two gates for two images.

30. An assembly as set forth in claim 29 further characterized by said processor means (16') including look-up table means (25') for receiving and comparing said time delay with said second gates to produce a video signal multiplied by minus one.

31. An assembly as set forth in claim 30 further characterized by said processor means (16') including buffer means (26') for accumulating and storing the image.

32. An assembly as set forth in claim 31 further characterized by said processor means (16') including arithmetic means (32') for receiving the video signal from one of the look-up table means (25') and camera means (14,', 14") and averaging same with the image stored in said buffer means (26').

33. An assembly as set forth in claims 24 or 25 further characterized by said reference signal comprising a sinusoidal waveform, and said delay generator means (28') adjusting the intensity of the radiation to be received based on the phase relationship between said reference signal and said timing signal.

34. An assembly as set forth in claim 33 further characterized by said processor means (16') including look-up table means (25') for receiving the phase relationship and multiplying said video signal by negative one according to the phase relationship to produce an adjusted video signal.

35. An assembly as set forth in claim 34 further characterized by said processor means (16') including buffer means (26') for accumulating and storing the image.

36. An assembly as set forth in claim 35 further characterized by said processor means (16') including arithmetic means (32') for receiving the video signal from one of the look-up table means (25') and camera means (14', 14") and averaging same with the image stored in said buffer means (26').

37. An assembly as set forth in claim 23 further characterized by said camera means (14''') including current mirror means (88''') and analog switches (90''') for multiplying the video signal by both negative and positive sinusoidal wave forms.

* * * * *